April 6, 1948.  A. E. FARR  2,439,206
CONTROL SURFACE LOCK FOR AIRCRAFT
Filed Nov. 16, 1942   3 Sheets-Sheet 2
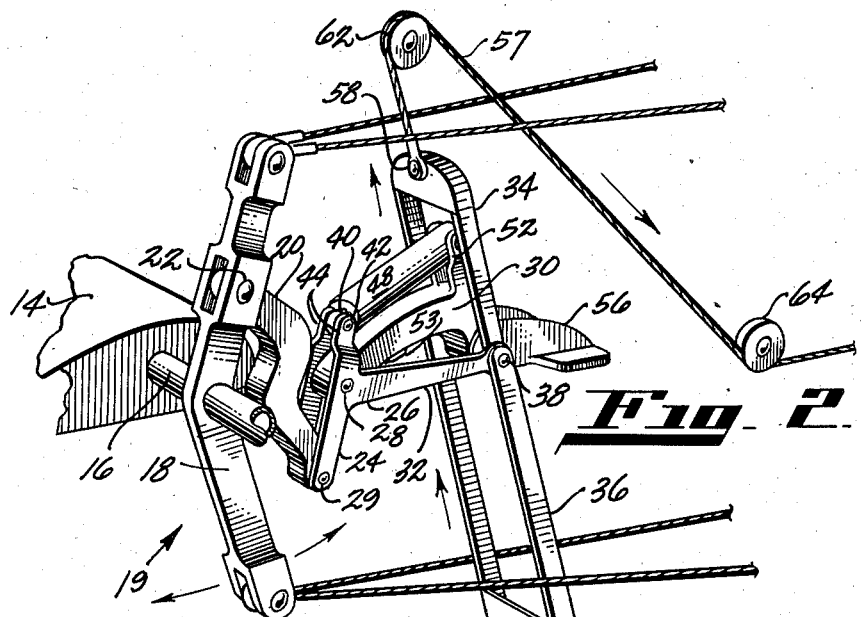
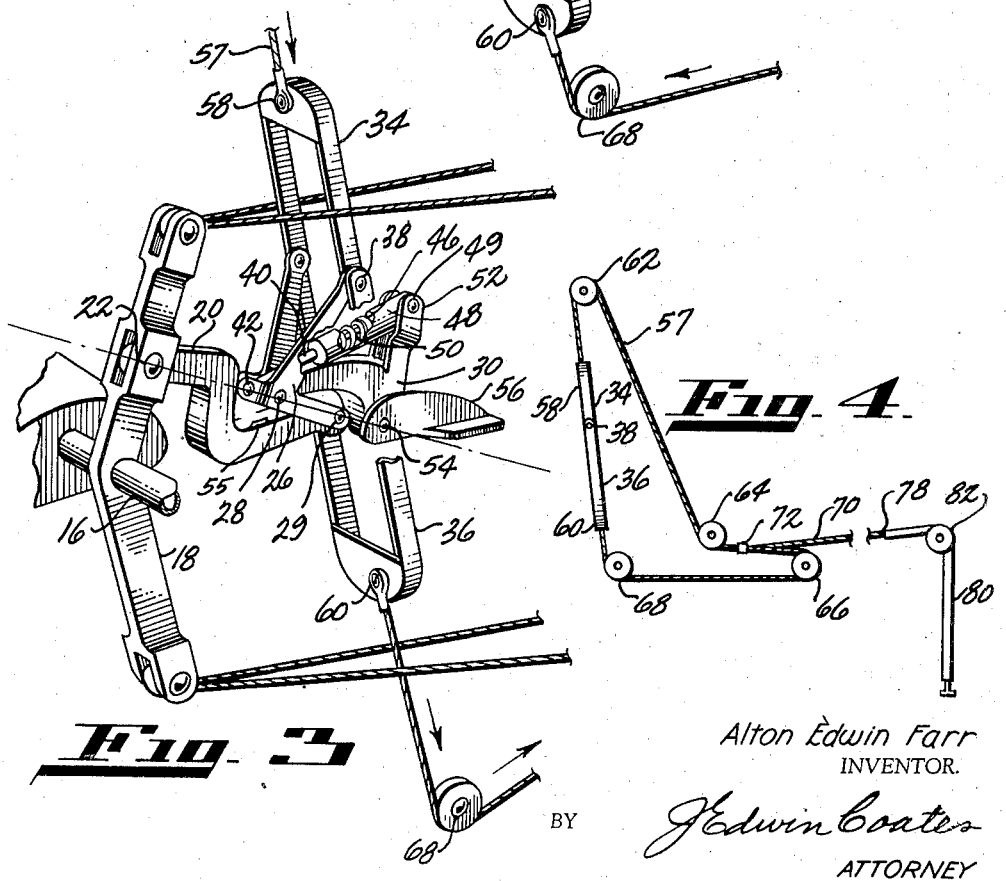
Alton Edwin Farr
INVENTOR.
BY J. Edwin Coates
ATTORNEY April 6, 1948.　　　　　A. E. FARR　　　　　2,439,206
CONTROL SURFACE LOCK FOR AIRCRAFT
Filed Nov. 16, 1942　　　3 Sheets-Sheet 3

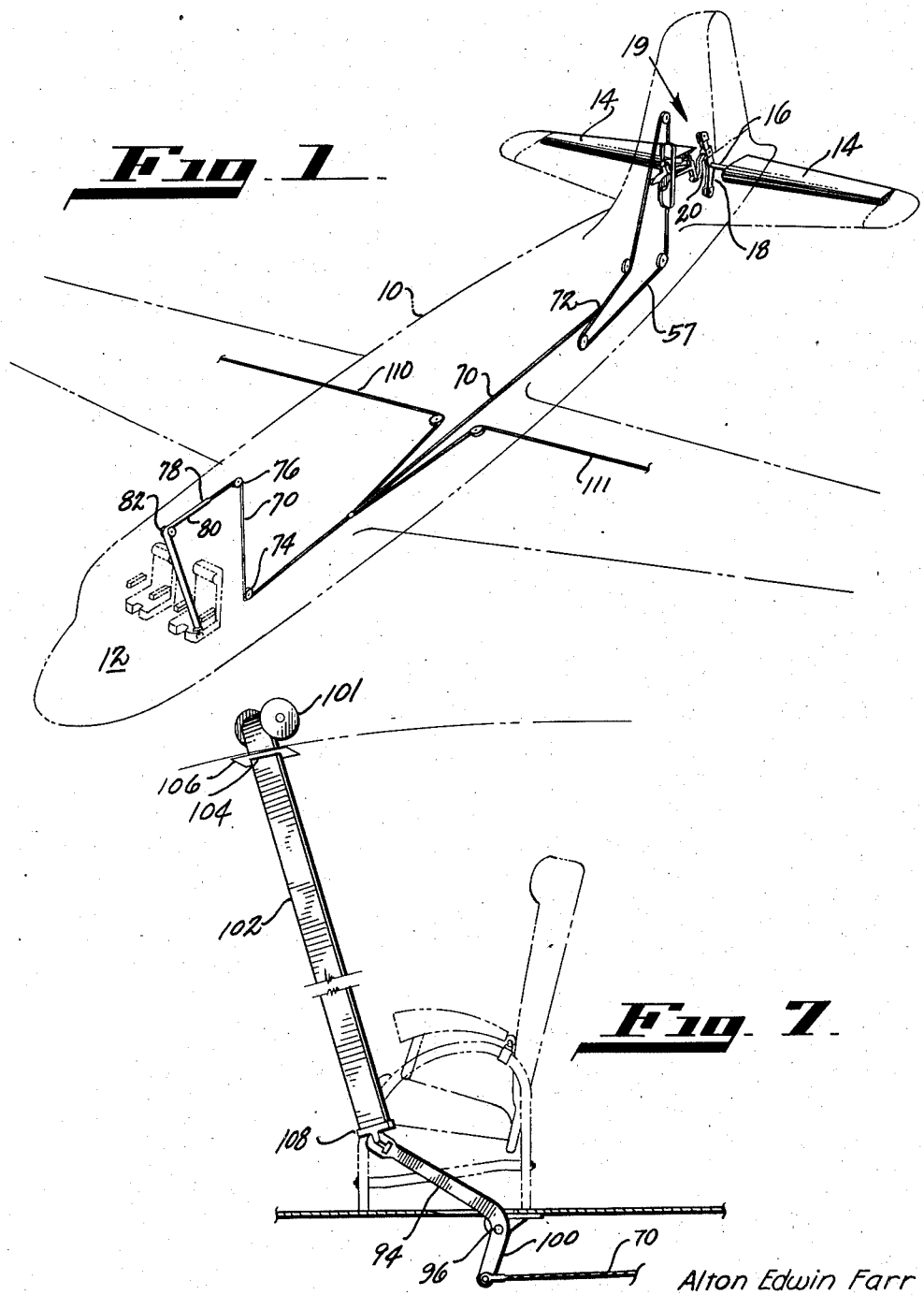

Alton Edwin Farr
INVENTOR.
BY J. Edwin Coates
ATTORNEY

Patented Apr. 6, 1948

2,439,206

UNITED STATES PATENT OFFICE 2,439,206

CONTROL SURFACE LOCK FOR AIRCRAFT

Alton Edwin Farr, Los Angeles, Calif., assignor to Douglas Aircraft Company, Inc., Santa Monica, Calif.

Application November 16, 1942, Serial No. 465,771

9 Claims. (Cl. 244—1)

This invention relates to a manually operated control surface lock for airplanes which may be operated from the pilot's compartment and is designed to prevent damage by wind to the control surfaces while the airplane is being taxied or is parked on the ground on a supporting surface.

Violent wind gusts can cause more damage to the control surfaces of an airplane while it is at rest on the ground than while it is in flight. Gusts of wind buffet the surfaces of a plane on the ground bringing about shock loading which in severe cases causes the surfaces to swing violently against their stops, eventually weakening the hinges and stretching the cables, rendering the surfaces liable to being torn from the airplane in flight.

It has been the practise to lock these surfaces against this undesirable movement while the airplane is at rest by the use of externally applied clamps which are designed to grip simultaneously the control surfaces and the adjoining fixed portions of the airplane. However, in order to secure all movable surfaces of an airplane a large number of these clamps is necessary and the use of them as standard equipment has become impractical both because of their weight and because of the amount of work involved in their application. In addition, there is the possibility of these externally applied clamps being inadvertently left in place at take-off, thereby rendering useless the controls to which they are attached. Thus it may readily be seen that in order to eliminate the hazards of these externally applied clamps it becomes necessary to have a control surface locking mechanism which can be controlled from the pilot's compartment and to have an adequate warning system attached thereto to inform the pilot of the position of the surface locking mechanism. This device should be capable of ready operation and be mounted in the airplane directly adjoining the surface to be locked.

This invention is applicable to any type of control surface such as rudders, elevators, flaps and the like. It provides a safe, easily operated means for holding the control surfaces in a rigid, neutral position with respect to the line of flight of an airplane. It further provides a manual control for operating the surface lock in the form of a warning ribbon suspended from the ceiling of the pilot's compartment which must be drawn downwardly across the pilot's face directly in his line of vision so that it may be hooked by a special type of fastening device to the side of his chair.

This control surface lock is adapted to serve two purposes. First it locks the surfaces while the airpalne is being parked on the ground or other supporting surface. The airplane when it is parked is held substantially stationary on three points of suspension. Thus the fuselage, wings, etc., form a reactionary point against which gusts of wind may buffet. The movable control surfaces are the only parts which give way to this buffeting since they are not under the control of the pilot when the airplane is parked and therefore receive the full force of the gust.

The second purpose of the lock is to hold the control surfaces in a substantially neutral position while the airplane is taxiing down-wind or cross-wind. There are times when the stresses brought to bear upon the surfaces of an airplane while taxiing in cross-winds or tail-winds are too great to be overcome by the manual force exerted on the controls by the pilot. For example, if a bimotored airplane is being taxied down a runway and a severe cross-wind strikes it broadside, the pilot with this invention is able to lock the control surfaces and steer the airplane by other methods. The motor or motors on one side of the airplane may be speeded up and with the additional help of the brakes the plane may be moved in any desired direction. Taxiing in this manner is safer than with surface controls and the control surfaces and their respective parts are protected against the injurious buffeting of the wind.

The control surface lock which forms the subject matter of this invention is also adapted to withstand sudden changes of temperature. In present day flying an airplane may make a landing where the air is at a comparatively high temperature. After "taking off" the airplane may climb to a very high altitude into air of sub-zero temperature. Operating parts of an airplane which are outside the heated cabin area such as the control cables and the like are exposed to severe temperature changes. Therefore, the use of hydraulic units is to be avoided for obvious reasons.

The surface locking means comprises a spring biased locking mechanism which, in the locking position, has a series of levers including four pivots which become displaced to lie in a dead center relationship whereupon the movement of the flight control actuating arm connected thereto is positively prevented. The kinematics of this linkage is such that the pilot's mechanical advantage goes from zero to infinity as the leverage is moved to the locked position. Thus the dead center linkage cuts down the forces involved, and the shock loads to the pilot and equipment are cut to a minimum.

The principal object of this invention is to provide a safe and easily operated means for locking the control surfaces of an airplane against movement by wind gusts while parking or taxiing.

Another object of the invention is to provide a means for locking the control surfaces while taxiing across or down wind with a minimum of friction.

Another object is to provide a mechanism which will function perfectly through quick changes of temperature.

Another object of this invention is to provide a mechanism which will act as an automatic centering device for the control surfaces.

Another object of this invention is to provide a visible indication in the form of a warning ribbon located in the pilot's compartment which will correctly indicate the position of the locking mechanism at all times.

Another object of this invention is to provide a warning ribbon which automatically recedes into and is concealed in the ceiling of the pilot's compartment when the controls are not locked.

Another object of this invention is to provide a means for attaching the warning ribbon to the side of the pilot's chair.

Another object of the invention is to provide a method for hooking the warning ribbon to the pilot's chair by a unique attaching means so that it can not be hooked at any other place but that intended.

Another object of this invention is to provide a spring biased locking mechanism which upon its release will immediately free the levers so that they may assume their unlocked position and allow the control surfaces to be moved as desired.

Another object of this invention is to provide a lock or latch which may be easily released when under load. The releasing movement is effected by a force operating at infinite mechanical advantage facilitating the release of the lock under full load if the pilot inadvertently "takes-off" with the lock "on."

Another object of this invention is to provide a series of levers which may be moved into a dead center relationship whereupon the movement of the flight control actuating arm connected thereto is positively prevented.

Still another object of the invention is to provide a locking means which is applicable to all controlling surfaces of an airplane.

Further objects and advantages of this invention will be brought out in the following description taken in connection with the accompanying drawings and appended claims:

Figure 1 is a perspective outline and schematic drawing of an airplane showing the entire control surface lock installation as applied to the elevators of an airplane.

Figure 2 is a partial perspective view showing the locking mechanism in the unlocked position as applied to the actuating arm of a control surface.

Figure 3 is a partial perspective view similar to that shown in Figure 2 showing the control mechanism in the locked position as applied to the actuating arm of a control surface.

Figure 4 is a schematic drawing showing the general hook-up of the locking device and warning system.

Figure 7 is an elevational view showing a modified form of the warning indicator and of the motion transmitting means for operating the control surface lock.

Figure 5:
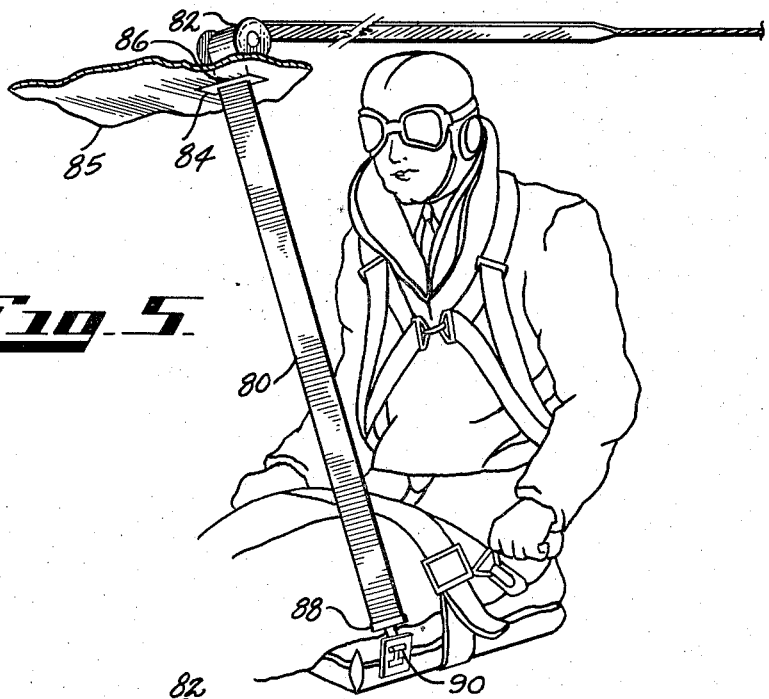
Figure 5 is an illustration showing the warning ribbon in place directly in the pilot's line of vision.

In detail and with reference to the accompanying drawings Figure 1 shows a schematic drawing of an airplane having a fuselage 10, one end of which terminates in a pilot's compartment 12. The opposite extremity of the fuselage terminates in an empennage of which two elevator surfaces 14 form a part. The two control surfaces are held together and pivoted by a torque tube 16 to which an actuating arm 18 is rigidly attached. A control surface locking mechanism 19 is adapted to cooperate with the movement of the actuating arm 18 so that it may be motivated by a control cable system having its controls in the pilot's compartment 12.

As shown in Figures 1, 2 and 3 the locking mechanism comprises a connecting link 20 which pivots at its one extremity to the control arm 18 at 22 and at its other extremity at 29 to an arm 24 of a bellcrank 26. The bellcrank is pivoted at 28 to a toggle arm 30 and is adapted to be rotated thereabout. The arms 32 of the bellcrank pivot at 38 to an upper locking yoke 34 and a lower locking yoke 36. A pair of ears 44 form an integral part of the bellcrank 26 and a piston rod 40 is pivoted to the bellcrank at 42. The piston rod terminates in a piston 46 which is enclosed in a tube 48. A spring 50 is interposed between the piston and the rear portion of the tube 48 so that the piston is constantly and resiliently urged to the other end of the tube 48. A pair of ears 52 are provided on the toggle arm 30 so that the spring assembly may be pivoted thereto at 49. Thus the pivot points 42 and 49 are constantly under resilient tension and tend to move toward each other. The toggle arm 30 is pivoted at 54 to a bracket 56 which is secured to the fuselage structure.

A stop 53 is provided on the under side of the toggle arm 30 and a similar stop 55 is provided on the upper side of the connection link 20. These two levers are formed in such a way that when they interlock against their stops their pivots will assume an in-line arrangement. Thus in the locked position a straight line may be drawn through the pivot points 22, 28, 29 and 54 of the mechanism so that a dead center condition exists with reference to the levers moving about the above named pivots.

A cable 57 is fastened to the upper locking yoke at 58 and passes over a series of pulleys 62, 64, 66 and 68 to form a loop, the end of which attaches to the lower locking yoke at 60. This loop forms the means for moving the locking yokes and also turns the bellcrank 26 about its pivot. Thus if the locking mechanism is set in the unlocked position, the stationary pivot axis 54 and the movable pivot axis 38 are held in coaxial alignment, the bellcrank 26 swings about the stationary axis 54, the connecting link 20 is free to move at its lower end without compressing the spring 50, and the control arm 18 is unrestricted and free to move as shown by the arrows in Figure 2. However, it may be seen from the drawings that when the locking yokes are drawn upwardly the bellcrank is turned counterclockwise acting against the spring assembly to draw the control arm by means of the connecting link to a neutral position. When the pivots 28 and 29 of the bellcrank assume an inline position relative to the pivots 22 and 54, the toggle arm, the bellcrank and the connecting links are in a dead center relationship with each other. In this manner the control arm is locked securely in a neutral position and remains so until the locking yoke is released. The spring assembly connected to the mechanism provides the means for urging the levers from their dead center and provides the force against which the device must be set.

Figure 6:
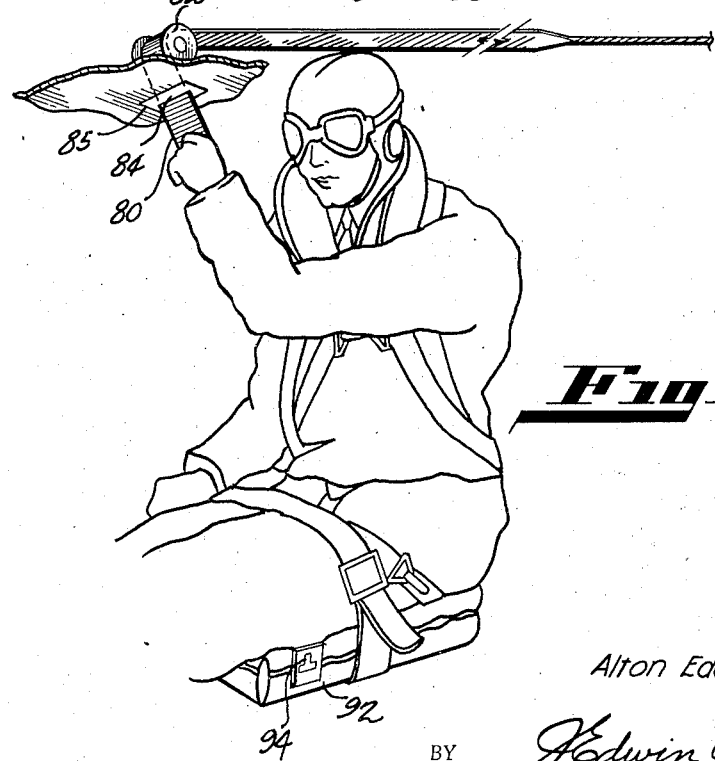
Figure 6 is an illustration similar to that shown in Figure 5 showing the warning ribbon being released and passing into an aperture in the ceiling of the pilot's compartment.

A pull cable 70 is affixed to the loop of the cable 56 at 72. (See Figures 1 and 4.) This pull cable is passed over a pair of pulleys 74 and 76. At 78 a warning ribbon 80 is secured to the extremity of the pull cable 70. The warning ribbon is passed over another pulley 82 which is concealed in the ceiling of the pilot's compartment. (See Figures 5 and 6.) Thence the ribbon is threaded downwardly through an aperture 84 in a stop plate 85 attached to the ceiling. A stop 88 is applied to the end of the ribbon 80 upon which a special hook 90 is formed. A plate 92 affixed to the side of the pilot's chair contains a slot 94 adapted to receive the special hook 90 so that it is impossible for the pilot to hook the warning ribbon to any object in the pilot's compartment but that intended.

The spring 50 resiliently loads the operating cable 70 to insure release of the lock at all times except when the pilot wishes to bring it into action and adjusts the ribbon 80 accordingly. It also insures release of the lock in the event of failure of the cable or other parts of the lock control when the lock is in locking position.

In operation the pilot is able to set the control surface lock by drawing the warning ribbon 80 downwardly from its resting place 86 on the ceiling of the pilot's compartment. The pilot continues to draw the warning ribbon downwardly across his line of vision until he is able to hook the special end 90 provided thereon to a suitable slot 92 on his chair. The special hook and slot provided for attaching the warning ribbon to the pilot's seat guard against any laxity on the pilot's part in not hooking the ribbon in its proper place.

The movement of the warning ribbon causes the pull cable 70 to draw the locking yokes 34 and 36 upward. The bellcrank 26 pivoted at 38 to the upper and lower locking yokes is moved counterclockwise about its pivot 28 on the toggle arm 30. The piston rod 40 pivoted to the ears 44 on the bellcrank is drawn outwardly against the compression spring 50 in the tube 48 until the toggle arm and the connecting link strike the stops provided thereon. When these levers strike their stops a dead center relationship of the pivots is obtained.

To put the control surface lock in operation, the pilot first sets his controls in the neutral position and then draws the warning ribbon downwardly and hooks it to the side of his chair. If the controls are not first set in neutral position, they will be brought to this position by movement of the pivoted end at 29 of the link 20 to locking position, as the locking mechanism is moved by the pilot to locking position.

This control surface lock may be advantageously used by the pilot while he is taxiing down a runway in a stiff cross-wind. Although the wind may be blowing at a steady rate, buildings or other objects located along the edge of the runway will interrupt the air currents so that stiff gusts are created. These gusts will strike the airplane and seriously interfere with the proper functioning of the control surfaces even to the point of making them unmanageable. The airplane is endangered and its personnel subjected to operative difficulties the greater portion of which are eliminated by the use of the control surface lock.

Taxiing down-wind also presents difficulties which in some instances assume dangerous proportions. It is often necessary for a pilot to taxi in an airplane long distances to reach the location for the discharge of passengers and baggage. If this distance is traveled in the face of a stiff tail wind the airplane is in an unstable condition which is directly due to the nature of the airplane's control surfaces which are designed for flight conditions and not for ground travel. However, if the surfaces are locked against the action of air currents during ground travel most of the harmful effects of such action are eliminated and taxiing of the airplane is made safer.

A modified motion-transmitting arrangement for operating the control surface locking mechanism is shown in Figure 7 of the drawings. A lever 94 is pivoted at 96 to the floor of the pilot's compartment beside the pilot's chair. An arm 100 of this lever extends into the space below the floor of the pilot's compartment. The pull cable 70 attaches to the end of the arm 100 so that all parts of the installation are below the floor line leaving only the handle of the lever 94 exposed in the pilot's compartment.

A reel 101 is concealed in the ceiling of the pilot's compartment having a warning ribbon 102 wound therearound. The end of the warning ribbon is threaded through an aperture 104 in a plate 106 which is secured to the ceiling. A stop 108 is affixed to the end of the warning ribbon 102 so that when this end is released from its fastening it will be caught by the plate 106 and be available for a downward pull by the pilot. After he has drawn it downwardly across his line of vision he may fasten it directly to the handle of the lever 94 by means of a specially shaped fastener and receiving aperture therefor. In this installation the pull cable 70 is directly connected to and controlled by the lever 94 and may lie under the flooring in the conventional manner. This installation eliminates the series of pulleys required to conduct the pull cable from below the flooring as shown in Figure 1 up the side of a bulkhead and over the ceiling of the pilot's compartment. It is evident that the lever 94 may not be secured in locking position except by drawing down the ribbon 102 and attaching it to the lever end, where it serves as a warning reminder that the lock must be released for take-off.

In Figure 1, the branch cables 110 and 111 lead from the cable 70 to aileron locking devices (not shown) which are similar in operative principle to the elevator lock 19 and are operated synchronously with the elevator lock by the pilot.

The invention has been disclosed herein in the showing and description of certain specific embodiments of the invention. The invention is not however limited to these embodiments but is to be given the scope defined in the following claims.

I claim:
1. In a control device for a movable flight control surface of an airplane the combination of: a control surface; a rigid member connected to said surface to be moved therewith; a stationary support; and a linkage means consisting of a plurality of pivotally connected links, the end links being pivotally connected to a movable portion of said rigid member and to said stationary support respectively; and means for selectively moving at least one of said links either to one position and holding it therein for arranging said pivotal connections on a dead center line thereby positioning said links to act as a rigid strut immovably relating said rigid member to said support or to another position for arranging said pivotal connections away from a dead center line thereby positioning said links to permit free movement of said rigid member relative to said support.

2. In a control device, the combination of a movable flight control surface of an airplane; a rigid member connected to said surface to be moved therewith; a stationary support; and a locking means permanently connected to a moving portion of said rigid member and permanently connected to said stationary support; and a single control means under the control of the operator for selectively adjusting said locking means either to connect said rigid member and said support in immovable relationship to each other or to connect said rigid member and said support for free movement of said rigid member relative to said support over a limited range.

3. The combination defined in claim 2 and in addition thereto; means applying a resilient force to move said locking means from its first mentioned adjustment to its second mentioned adjustment.

4. In a lock for a movable flight control surface of an airplane, the combination of: a control surface; a rigid movable member non-flexibly connected to said surface and movable therewith; a locking link pivotally connected at one end to said member; a stationary support having a pivot means; adjustable means connecting said pivot means with the other end of said locking link constructed so as, in one position of adjustment to hold said other end stationary at a point preventing movement of said member and, in another position of adjustment to permit free movement of said other end about said one end when a moving force is applied to said member; a single control under the control of the pilot for selectively adjusting said adjustable means to either of said positions.

5. The combination defined in claim 4 in which said adjustable means is a linkage assembly constructed when in said one position of adjustment to hold said other end stationary on a straight line passing through the pivot connection of said locking link and member and through said pivot means and when in said other position to rotate bodily with said other end about said pivot means as a center.

6. The combination defined in claim 4 in which said adjustable means is a linkage assembly comprising a first lever arm pivoted at one end to said pivot means and a second lever arm of the same leverage length as said first lever arm pivoted at one end to the other end of said first lever arm, and said adjusting means under the control of the pilot holds the other end of said second lever arm stationary either in a first position in which it is alined with the axis of said pivot means or in a second position in which it is substantially displaced from said axis, said second lever arm being pivotally connected at a point remote from its said other end and offset from its axis to the other end of said locking link, and the axis of said pivot between said arms and the axis of the pivot between said locking link and said second arm being rectilinearly alined with said pivot means in said second position; and in addition thereto a spring arranged to apply a resilient force to said linkage assembly in a direction to move said assembly from said first position to said second position.

7. In a lock for a movable flight control surface of an airplane, the combination of: a control surface; a rigid movable member non-flexibly connected to said surface and movable therewith; a locking link having a pivotal connection at one end to said member; a stationary support having a first pivot means toward and away from which said pivotal connection is movable; a lever arm pivoted to said first pivot means and extending toward said movable member; a second pivot means; means under the control of the pilot for moving said second pivot means in a limited travel path which is at a substantial angle to a line connecting said first pivot means and said pivotal connection and which axially coincides with said first pivot means at one end of said path, said second pivot means being yieldably movable transversely from said path; a bellcrank pivotally connected at the end of its one arm to said second pivot means and at its angle bend to the free end of said lever arm, and at the end of its other arm to the other end of said locking link, the lever arm and said one bellcrank arm being of equal length; a spring connected to relatively moving parts of the lock for applying a force to move said second pivot means toward said coaxial position, the parts of the lock being related and dimensioned when said second pivot means is at the other end of its path to place in rectilinear alinement and in the order named the pivotal connections as follows: (1) connecting the rigid member and locking link; (2) connecting the bellcrank angle and lever arm; (3) connecting the locking link and bellcrank; and (4) connecting the lever arm and first pivot means.

8. In a locking device for a movable flight control surface of an airplane: a control surface; means for pivotally mounting said surface to said airplane; a rigid member connected to said surface to be moved therewith; support means; means for securing said support means to said airplane adjacent said surface; a locking means comprising a plurality of pivotally interconnected links, one of said links being pivotally connected to said member, another of said links being pivotally connected to said support means; and means for moving one of said links to dispose all pivotal connections between said links in alignment whereby the rigid member is held against movement.

9. In a locking device for a movable flight control surface of an airplane: a movable flight control surface; a support means fixed to a stationary part of said airplane adjacent the movable control surface; a rigid member connected to said surface and movable therewith relative to said stationary part; a link having one and pivotally connected to said member; a second link having one end pivotally connected to said support means; a bell crank lever pivotally mounted to the free end of said second link; pivotal means interconnecting the free end of said first named link and the one arm of said bell crank lever; and means connected to the other arm of said bell crank lever for moving said lever and the links interconnected thereby to a position in which the pivotal connections therebetween are aligned with the pivotal connections between said links and the rigid member and support to lock said rigid member against movement, whereby said control surface is held against movement.

ALTON EDWIN FARR.

REFERENCES CITED

The following references are of record in the file of this patent:

UNITED STATES PATENTS

| Number | Name | Date |
|---|---|---|
| 289,949 | Winter | Dec. 11, 1883 |
| 366,774 | Isbell | July 19, 1887 |
| 1,747,344 | Bell | Feb. 18, 1930 |
| 2,035,231 | Haberstro | Mar. 24, 1936 |
| 2,054,970 | Etten | Sept. 22, 1936 |
| 2,069,047 | Ray | Jan. 26, 1937 |
| 2,245,252 | Cleghorn | June 10, 1941 |
| 2,260,481 | Ranasey | Oct. 28, 1941 |
| 2,280,246 | McCullough | Apr. 21, 1942 |
| 2,280,809 | Evans | Apr. 28, 1942 |